United States Patent
Hong

(10) Patent No.: US 12,369,048 B2
(45) Date of Patent: Jul. 22, 2025

(54) MEASUREMENT CONFIGURATION METHOD AND METHOD FOR REPORTING MEASUREMENT INFORMATION

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 316 days.

(21) Appl. No.: 17/761,163

(22) PCT Filed: Sep. 17, 2019

(86) PCT No.: PCT/CN2019/106059
§ 371 (c)(1),
(2) Date: Mar. 16, 2022

(87) PCT Pub. No.: WO2021/051252
PCT Pub. Date: Mar. 25, 2021

(65) Prior Publication Data
US 2023/0354059 A1   Nov. 2, 2023

(51) Int. Cl.
*H04W 24/02* (2009.01)
(52) U.S. Cl.
CPC .................. *H04W 24/02* (2013.01)
(58) Field of Classification Search
CPC ...... H04W 24/02; H04W 24/08; H04W 24/10
See application file for complete search history.

(56) References Cited

U.S. PATENT DOCUMENTS

| 2011/0183661 A1* | 7/2011 | Yi | H04W 24/10 455/422.1 |
| 2012/0039189 A1* | 2/2012 | Suzuki | H04W 48/12 370/252 |

(Continued)

FOREIGN PATENT DOCUMENTS

| CN | 109474953 A | 3/2019 | |
| WO | WO-2015106441 A1 * | 7/2015 | ............ H04W 24/10 |

(Continued)

OTHER PUBLICATIONS

PCT/CN2019/106059 English translation of International Search Report dated May 27, 2020, 2 pages.

(Continued)

*Primary Examiner* — Jay P Patel
(74) *Attorney, Agent, or Firm* — Cozen O'Connor

(57) ABSTRACT

A measurement configuration method includes generating, by a base station, minimization of drive tests (MDT) measurement configuration information of a network slice for a user equipment (UE) that supports MDT. The method further includes sending, by the base station to the UE, the MDT measurement configuration information of the network slice. A method for reporting measurement information includes performing, by a user equipment (UE), minimization of drive tests (MDT) measurement of a network slice based on MDT measurement configuration information of the network slice in response to entering an idle state or an inactive state; and reporting, by the UE, MDT measurement information of the network slice to a base station in response to meeting a measurement reporting condition.

16 Claims, 6 Drawing Sheets

(56) References Cited

U.S. PATENT DOCUMENTS

| | | | | |
|---|---|---|---|---|
| 2012/0088457 A1* | 4/2012 | Johansson | H04W 24/10 | 455/67.11 |
| 2013/0045735 A1* | 2/2013 | Kim | H04W 24/10 | 455/422.1 |
| 2013/0114446 A1* | 5/2013 | Liu | H04W 24/10 | 370/252 |
| 2013/0189990 A1* | 7/2013 | Kim | H04B 17/27 | 455/517 |
| 2013/0203357 A1* | 8/2013 | Chuang | H04W 24/10 | 455/67.11 |
| 2013/0203358 A1* | 8/2013 | Chuang | H04W 24/04 | 455/67.11 |
| 2013/0203406 A1* | 8/2013 | Chuang | H04W 24/10 | 455/424 |
| 2014/0155056 A1* | 6/2014 | Jactat | H04W 16/18 | 455/422.1 |
| 2014/0317456 A1* | 10/2014 | Kim | H04W 24/10 | 714/48 |
| 2015/0031308 A1* | 1/2015 | Schmidt | H01Q 1/243 | 455/67.11 |
| 2015/0230104 A1* | 8/2015 | Liu | H04W 8/20 | 455/418 |
| 2015/0281990 A1* | 10/2015 | Kelley | H04W 24/10 | 370/241 |
| 2015/0312850 A1* | 10/2015 | Li | H04W 24/00 | 370/329 |
| 2017/0202042 A1* | 7/2017 | Gao | H04W 76/14 | |
| 2017/0215098 A1* | 7/2017 | Huang | H04W 76/14 | |
| 2017/0265097 A1* | 9/2017 | Kim | H04W 24/10 | |
| 2018/0063737 A1* | 3/2018 | Yamine | H04W 24/10 | |
| 2019/0349774 A1* | 11/2019 | Lou | H04W 36/13 | |
| 2020/0329394 A1* | 10/2020 | Kimba Dit Adamou | H04W 24/08 | |
| 2020/0412842 A1* | 12/2020 | Park | H04W 80/10 | |
| 2021/0006996 A1* | 1/2021 | Kimba Dit Adamou | H04W 24/02 | |
| 2021/0067998 A1* | 3/2021 | Li | H04W 72/04 | |
| 2021/0084121 A1* | 3/2021 | Park | H04W 76/15 | |
| 2021/0120448 A1* | 4/2021 | Zhang | H04W 76/18 | |
| 2021/0281468 A1* | 9/2021 | Al-Kanani | H04W 4/50 | |
| 2021/0337410 A1* | 10/2021 | Hong | H04W 8/005 | |
| 2021/0360449 A1* | 11/2021 | Kim | H04W 76/15 | |
| 2021/0400519 A1* | 12/2021 | Kimba Dit Adamou | H04W 24/10 | |
| 2022/0141679 A1* | 5/2022 | Chang | H04W 16/18 | 370/329 |
| 2022/0141692 A1* | 5/2022 | Chang | H04W 24/08 | 370/252 |
| 2022/0151011 A1* | 5/2022 | Chang | H04W 76/27 | |
| 2022/0167196 A1* | 5/2022 | Arshad | H04W 24/10 | |
| 2022/0201526 A1* | 6/2022 | Tomala | H04W 24/08 | |

FOREIGN PATENT DOCUMENTS

| | | | | |
|---|---|---|---|---|
| WO | WO-2015139380 A1 * | 9/2015 | | H04W 24/10 |
| WO | WO-2015168859 A1 * | 11/2015 | | H04W 24/10 |
| WO | WO 2018184656 A1 | 10/2018 | | |
| WO | WO 2019047784 A1 | 3/2019 | | |
| WO | WO-2019101125 A1 * | 5/2019 | | H04W 24/08 |
| WO | WO-2019101126 A1 * | 5/2019 | | H04W 24/00 |

OTHER PUBLICATIONS

European Patent Application No. 19946224.3, Search and Opinion dated Sep. 8, 2022, 14 pages.

Indian Patent Application No. 202247022142, Office Action dated Sep. 21, 2022, 7 pages.

3GPP TSG-RAN "MDT Based On User Differentiation" WG2 #106, Tdoc-R2-1904007, May 2019, 5 pages.

CATT "Slice Based UE Mobility Optimization" 3GPP TSG-RAN, R2-1905869, Meeting #106, May 2019, 3 pages.

VIVO "MDT Measurement quantities and UE impact" 3GPP TSG-RAN WG2 #105bis, R2-1903344, Apr. 2019, 3 pages.

* cited by examiner

MEASUREMENT CONFIGURATION METHOD AND METHOD FOR REPORTING MEASUREMENT INFORMATION

CROSS-REFERENCE TO RELATED APPLICATION

This application is a national phase of International Application No. PCT/CN2019/106059, filed on Sep. 17, 2019, the content of which is hereby incorporated by reference in its entirety.

TECHNICAL FIELD

The disclosure relates to a field of communication technologies, and in particular to a measurement configuration method and a measurement configuration method, a method and a device for reporting measurement information, a base station, a user equipment, and computer-readable storage medium.

BACKGROUND

The mobile communication technology and industry has begun developing the fifth-generation mobile communication technology (5th Generation, 5G for short). The 5G technology will meet user needs for ultra-high traffic density, ultra-high connection density, and ultra-high mobility, and can provide users with extreme service experiences such as high-definition video, virtual reality, augmented reality, cloud desktop, and online games.

SUMMARY

According to a first aspect, there is provided a measurement configuration method, applied to a base station. The method includes:
  generating minimization of drive tests (MDT) measurement configuration information of a network slice for a user equipment (UE) supporting MDT; and
  sending the MDT measurement configuration information of the network slice to the UE.

According to a second aspect, there is provided a method for reporting measurement information, applied to a user equipment (UE). The method includes:
  performing minimization of drive tests (MDT) measurement of a network slice based on MDT measurement configuration information of the network slice in response to entering an idle state or an inactive state; and
  reporting MDT measurement information of the network slice to a base station in response to meeting a measurement reporting condition.

According to a third aspect, there is provided a user equipment (UE), including:
  a processor; and
  a memory, for storing instructions executable by the processor;
  the processor is configured to:
    perform minimization of drive tests (MDT) measurement of a network slice based on MDT measurement configuration information of the network slice in response to entering an idle state or an inactive state; and
    report MDT measurement information of the network slice to a base station in response to meeting a measurement reporting condition.

it is to be understood that the above general description and the detailed description later are only exemplary and explanatory and do not limit the disclosure.

BRIEF DESCRIPTION OF THE DRAWINGS

The accompanying drawings, which are incorporated in and constitute a part of this specification, illustrate embodiments consistent with the disclosure, and together with the description serve to explain the principles of the disclosure.

DETAILED DESCRIPTION

Figure 1:
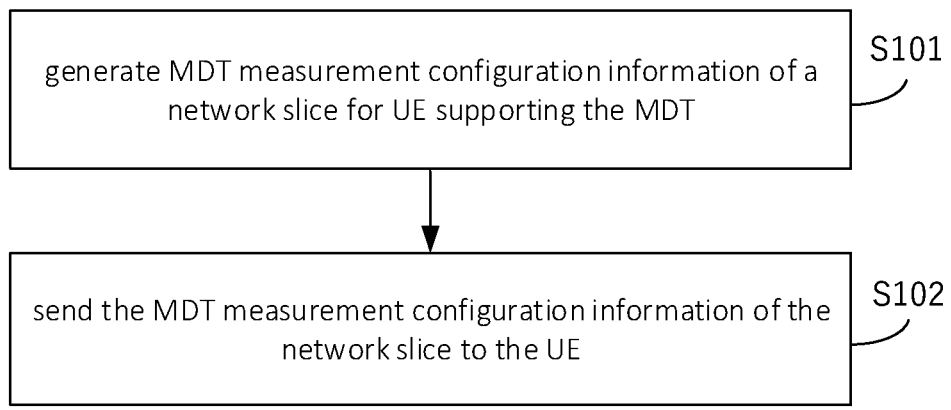
FIG. 1 is a flowchart illustrating a measurement configuration method in accordance with an embodiment of the disclosure.

Embodiments will be described in detail, where examples of which are illustrated in the accompanying drawings. When referring to the drawings in the specification below, the same numerals in different drawings represent the same or similar elements unless otherwise indicated. The implementations described in the examples below are not intended to represent all implementations consistent with the disclosure. Rather, they are merely examples of apparatus and methods consistent with some aspects of the disclosure as recited in the appended claims.

Cellular often adopt a "one-size-fits-all" network architecture, which is suitable for a single-service network. However, with this vertical architecture, it is difficult for operators to expand the network, and it is also difficult for operators to adapt to the changing user needs, business needs and industry needs, or to meet the needs of new applications. Therefore, in the 5G network, the "one-size-fits-all" model of the cellular network can no longer meet different network needs of users with many different performance criteria in the 5G era. Operators need to take certain measures to flexibly adjust and combine network performance indicators such as rate, capacity, and coverage to meet the individual needs of different services.

Network slice is one means to solve the above problem. By slicing network resources, a single physical network can be divided into multiple logical virtual networks. By assigning independent network slices for business scenarios, and designing enhanced network slices according to business requirements, the network architecture realizes good resource allocation and process optimization. Also, multiple network slices may share the network infrastructure, thereby improving the utilization of network resources and providing support for different user groups to use different services.

Therefore, embodiments disclosed herein provide a measurement configuration method and a method for reporting measurement information, which will be described in detail below.

FIG. 1 is a flowchart illustrating a measurement configuration method in accordance with an embodiment of the disclosure. This embodiment is described from a perspective of base station. As illustrated in FIG. 1, the measurement configuring method includes the following.

At block S101, minimization of drive tests (MDT) measurement configuration information of a network slice is generated for a UE supporting the MDT.

A base station may determine whether the UE supports the MDT based on capability information reported by the UE. For a UE supporting the MDT, the base station may generate the MDT measurement configuration information of the network slice.

In this embodiment, the MDT measurement configuration information of the network slice may include at least one of a first correspondence between the base station and the network slice(s) supported by the base station, and a second correspondence between a tracking area (TA) and the network slice(s) supported by the TA. For example, the MDT measurement configuration information may include an identifier of a corresponding base station and identifier(s) of network slice(s) supported by the corresponding base station, as well as an identifier of a corresponding TAs and identifier(s) of network slice(s) supported by the corresponding TA.

In this embodiment, the MDT measurement configuration information of the network slice may also include at least one of identifier(s) of network slice(s) that the UE expects to use but the base station does not support, and identifier(s) of network slice(s) that the UE expects to use but the TA does not support. For example, the MDT measurement configuration information may include a network slice 1 that is expected to be used by the UE but is not supported by the base station #1 and a network slice 3 that is expected to be used by the UE but is not supported by the TA1.

At block S102, the MDT measurement configuration information of the network slice is sent to the UE.

After generating the MDT measurement configuration information of the network slice for the UE supporting the MDT, the MDT measurement configuration information of the network slice is sent to the UE.

In the above embodiment, by generating the MDT measurement configuration information of the network slice for the UE supporting the MDT, and sending the corresponding MDT measurement configuration information to the UE, the UE can report MDT measurement information of the network slice to the base station based on the MDT measurement configuration information. Since the MDT measurement information of the network slice includes information about whether the base station supports the network slice or not, it is possible that network optimization can be performed subsequently based on the MDT measurement information of the network slice.

Figure 2:
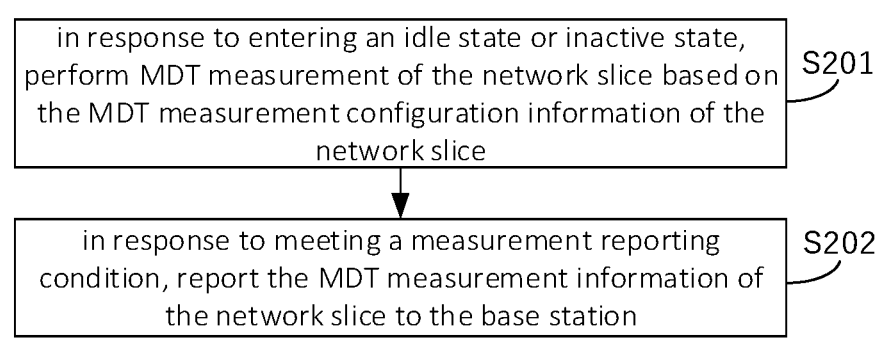
FIG. 2 is a flowchart illustrating a method for reporting measurement information in accordance with an embodiment of the disclosure.

FIG. 2 is a flowchart illustrating a method for reporting measurement information in accordance with an embodiment of the disclosure. As illustrated in FIG. 2, the method for reporting measurement information includes the following.

At block S201, in an idle state or an inactive state, MDT measurement of the network slice is performed based on the MDT measurement configuration information of the network slice.

In some embodiments, the method may further include receiving the MDT measurement configuration information of the network slice sent by the base station.

While the UE is in the idle state or the inactive state, the UE may perform the MDT measurement of the network slice based on the MDT measurement configuration information of the network slice, and save the MDT measurement information of the network slice.

In this embodiment, the MDT measurement configuration information of the network slice may include at least one of a first correspondence between a base station and network slice(s) supported by the base station, and a second correspondence between a TA and network slice(s) supported by the TA. For example, the MDT measurement configuration information may include an identifier of a corresponding base stations and an identifier of network slice(s) supported by the corresponding base station, as well as an identifier of a corresponding TA and identifier(s) of network slice(s) supported by the corresponding TA.

In this embodiment, the MDT measurement configuration information of the network slice may also include at least one of identifier(s) of the network slice(s) that the UE expects to use but the base station does not support, and identifier(s) of the network slice(s) that the UE expects to use but the TA does not support. For example, the MDT measurement configuration information of the network slice may include a network slice 1 that is expected to be used by the UE but is not supported by the base station #1, and a network slice 3 that is expected to be used by the UE but is not supported by the TA1.

At block S202, when a measurement reporting condition is met, the MDT measurement information of the network slice is reported to the base station.

The measurement reporting condition may include, but is not limited to, measurement reporting time, reported measurement information type, and the like.

For example, when the measurement reporting time is reached, the MDT measurement information of the network slice is reported to the base station. After receiving the MDT measurement information of the network slice, the base station can perform network optimization based on the MDT measurement information of the network slice. For example, a corresponding network slice can be deployed for a problematic coverage area of the network. In some examples, the MDT measurement information of the network slice can also be reported to an Operation Administration and Maintenance (OAM), such that the operator can deploy the network slice based on the MDT measurement information.

The problematic coverage area of the network can be determined in various ways. For example, in a case of determining that for a network slice that the UE expects to use but the base station does not support, the number of the network slices exceeds a preset number, an area where the network slice that the number exceeds the preset number is located is determined as the problematic coverage area of the network. As another example, the network slice(s) that is not supported by a base station is determined based on identifier(s) of network slice(s) supported by the base station reported by the UE, and an area where the network slice(s) that is not supported by the base station is determined as the problematic coverage area of the network. For example, the base station can receive that the network slices supported by the base station that are reported by the UE1 are network slices 1, 2, and 3, the network slices supported by the base station that are reported by the UE2 are network slices 1, 3, and 4, and the network slices supported by the base station that are reported by the UE3 are network slices 1, 2, and 4. It can be determined that the network slices supported by the base station are network slices 1, 2, 3, and 4. In a case where the network slices currently provided for the base station are network slices 1-6, where each network slice corresponds to a determined physical coverage area (the division of areas can be adjusted), it can be determined that the base station does not support the network slices 5 and 6. Therefore, the areas corresponding to the network slices 5 and 6 can be determined as the problematic coverage area of the network (i.e., an area should have been configured with the network slice but is not configured with any network slice) and the network slices 5 and 6 can be deployed for the base station.

In the above embodiment, the MDT measurement of the network slice is performed based on the MDT measurement configuration information of the network slice, and in response to meeting the measurement reporting condition, the MDT measurement information of the network slice is reported to the base station, such that the base station can perform targeted network optimization based on the MDT measurement information of the network slice.

Figure 3:
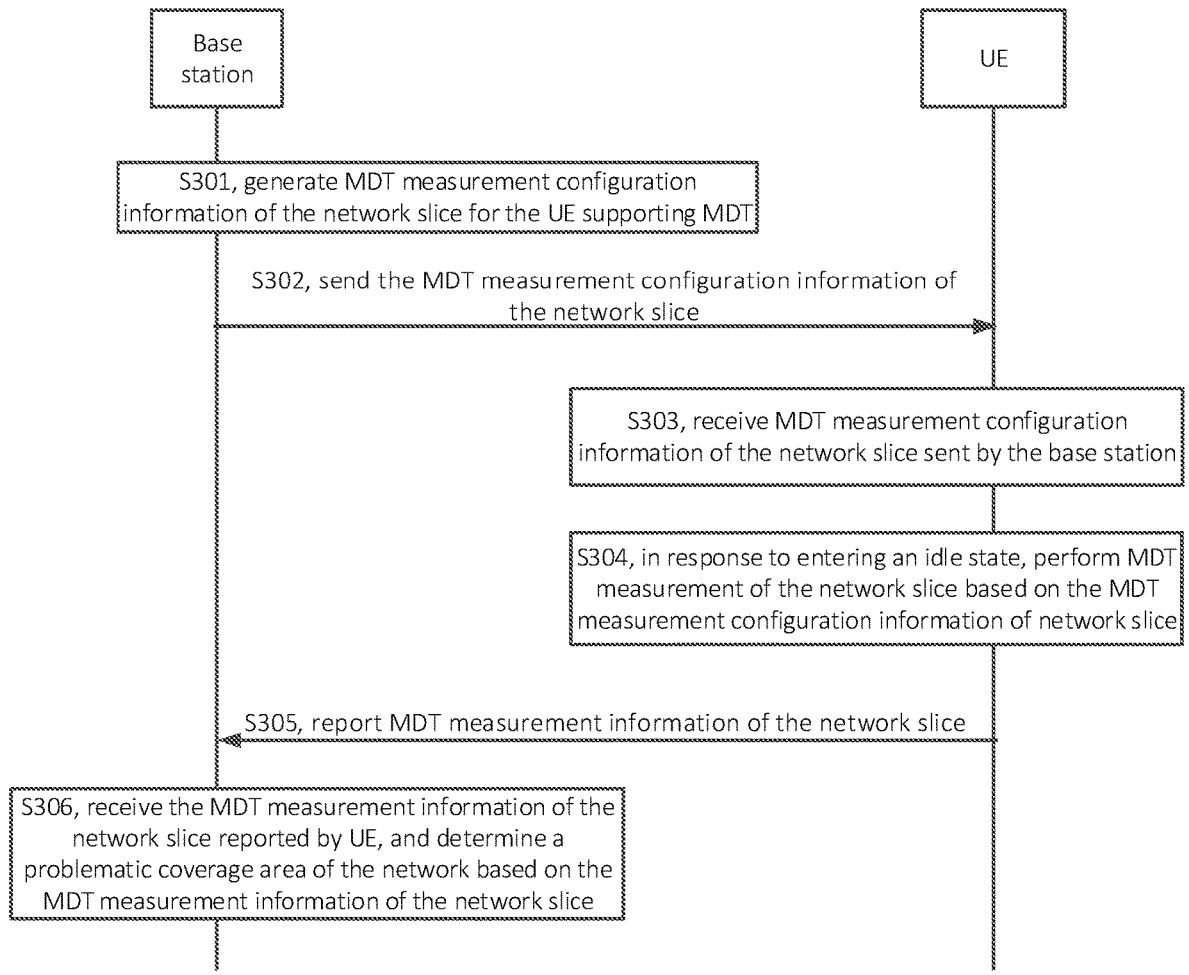
FIG. 3 is a flowchart illustrating signaling of determining a problematic coverage area of network in accordance with an embodiment of the disclosure.

FIG. 3 is a signaling flowchart for determining a problematic coverage area of network in accordance with an embodiment of the disclosure. This embodiment is described from a perspective of the interaction between a base station and a UE. As illustrated in FIG. 3, the method includes the following.

At block S301, the base station generates MDT measurement configuration information of a network slice for the UE supporting MDT.

At block S302, the base station sends the MDT measurement configuration information of the network slice to the UE.

At block S303, the UE receives the MDT measurement configuration information of the network slice sent by the base station.

At block S304, when the UE enters an idle state, the UE performs MDT measurement of the network slice based on the MDT measurement configuration information of the network slice.

At block S305, in response to meeting a measurement reporting condition, the UE reports MDT measurement information of the network slice to the base station.

At block S306, the base station receives the MDT measurement information of the network slice reported by the UE, and determines a problematic coverage area of the network based on the MDT measurement information of the network slice.

In this embodiment, in a case of determining, based on the MDT measurement information of the network slice, that for a network slice that the UE expects to use but the base station does not support, the number of the network slices exceeds a preset number, an area where the network slice that the number exceeds the preset number is located is determined as the problematic coverage area of the network.

The preset number can be flexibly set as needed.

For example, in response to determining that, for the network slice 2 that the UE expects to use but the base station does not support, the number of the network slices 2 exceeds the preset number, the area where the network slice 2 is located can be determined as the problematic coverage area of the network, and the operator can deploy the network slice 2 for the base station, to meet needs of the UE.

In the above embodiment, through the interaction between the base station and the UE, the base station can generate the MDT measurement configuration information of the network slice for the UE supporting the MDT, and send the corresponding MDT measurement configuration information to the UE, such that the UE can report the MDT measurement information to the base station based on the MDT measurement configuration information. The base station can determine the problematic coverage area of the network based on the MDT measurement information of the network slice, and perform the targeted network optimization.

Figure 4:
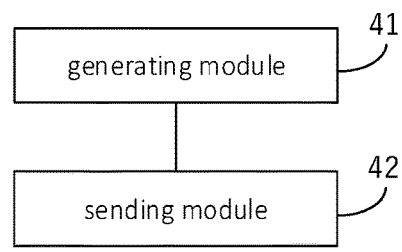
FIG. 4 is a block diagram illustrating a measurement configuration apparatus in accordance with an embodiment of the disclosure.

FIG. 4 is a block diagram illustrating a measurement configuration device in accordance with an embodiment of the disclosure. The device is included in a base station. As illustrated in FIG. 4, the device includes a generating module 41 and a sending module 42.

The generating module 41 is configured to generate minimization of drive tests (MDT) measurement configuration information of a network slice for a user equipment (UE) supporting MDT.

It is determined whether the UE supports the MDT based on capability information reported by the UE. For a UE supporting the MDT, the base station may generate the MDT measurement configuration information of the network slice.

In this embodiment, the MDT measurement configuration information of the network slice may include at least one of a first correspondence between the base station and the network slice(s) supported by the base station, and a second correspondence between a tracking area (TA) and the network slice(s) supported by the TA. For example, the MDT measurement configuration information may include an identifier of a corresponding base station and identifier(s) of network slice(s) supported by the corresponding base station, as well as an identifier of a corresponding TAs and identifier(s) of network slice(s) supported by the corresponding TA.

In this embodiment, the MDT measurement configuration information of the network slice may also include at least one of identifier(s) of network slice(s) that the UE expects to use but the base station does not support, and identifier(s) of network slice(s) that the UE expects to use but the TA does not support. For example, the MDT measurement configuration information may include a network slice 1 that is expected to be used by the UE but is not supported by the base station #1 and a network slice 3 that is expected to be used by the UE but is not supported by the TA1.

The sending module 42 is configured to send the MDT measurement configuration information of the network slice generated by the generating module 41 to the UE.

After generating the MDT measurement configuration information of the network slice for the UE supporting the MDT, the MDT measurement configuration information of the network slice is sent to the UE.

In the above embodiment, by generating the MDT measurement configuration information of the network slice for the UE supporting the MDT, and sending the corresponding MDT measurement configuration information to the UE, the UE can report the MDT measurement information of the network slice to the base station based on the MDT measurement configuration information. Since the MDT measurement information of the network slice includes information about whether the base station supports the network slice or not, it is possible that network optimization can be performed subsequently based on the MDT measurement information of the network slice.

Figure 5A:
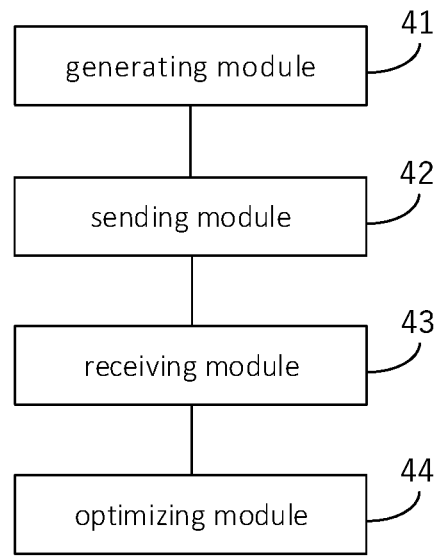
FIG. 5A is a block diagram illustrating another measurement configuration apparatus in accordance with an embodiment of the disclosure.

FIG. 5A is a block diagram illustrating another measurement configuration apparatus in accordance with an embodiment of the disclosure. As illustrated in FIG. 5A, on the basis of the embodiment illustrated in the above-mentioned FIG. 4, the apparatus may also include a receiving module 43 and an optimizing module 44, The receiving module 43 is configured to receive the MDT measurement information of the network slice reported by the UE.

The optimizing module 44 is configured to perform network optimization based on the MDT measurement information of the network slice received by the receiving module 43.

In this embodiment, in a case of determining, based on the MDT measurement information of the network slice, that for a network slice that the UE expects to use but the base station does not support, the number of the network slices exceeds a preset number, an area where the network slice that the number exceeds the preset number is located is determined as the problematic coverage area of the network.

The preset number can be flexibly set as needed.

For example, in response to determining that, for the network slice 2 that the UE expects to use but the base station does not support, the number of the network slices 2 exceeds the preset number, the area where the network slice 2 is located can be determined as the problematic coverage area of the network, and the operator can deploy the network slice 2 for the base station, to meet needs of the UE.

In the above embodiment, by receiving the MDT measurement information of the network slice reported by the UE, since the MDT measurement information of the network slice includes information about whether the base station supports the network slice or not, the targeted network optimization can be performed based on the MDT of the network slice.

Figure 5B:
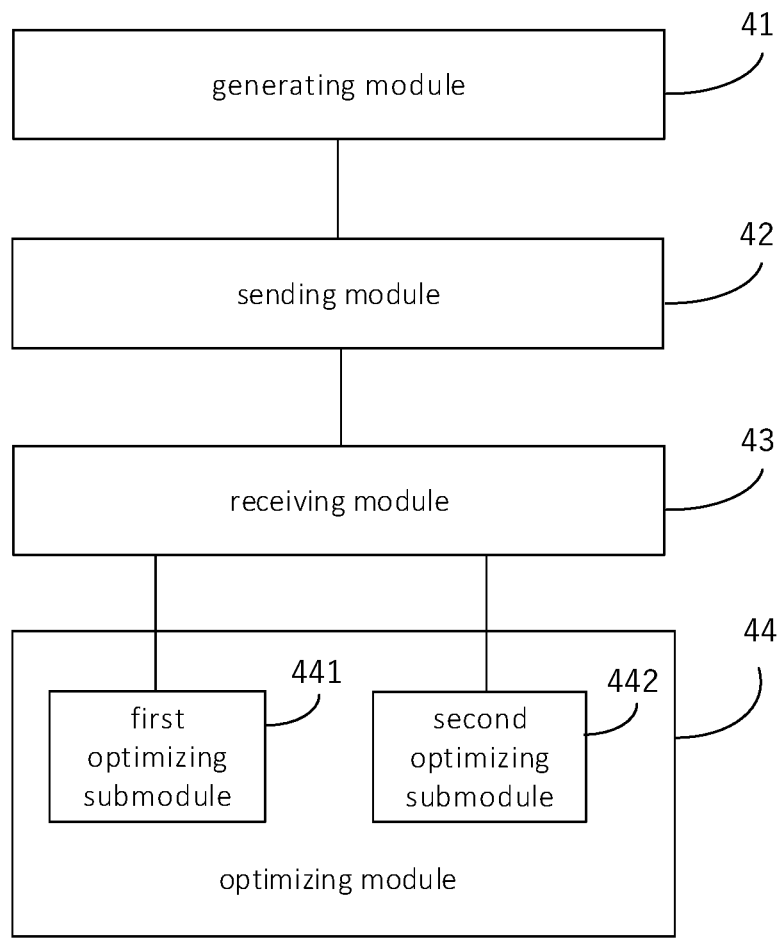
FIG. 5B is a block diagram illustrating another measurement configuration apparatus in accordance with an embodiment of the disclosure.

FIG. 5B is a block diagram illustrating another measurement configuration device in accordance with an embodiment of the disclosure. As illustrated in FIG. 5B, on the basis of the embodiment illustrated in the above-mentioned FIG. 5A, the optimizing module 44 includes:

a first determining sub-module 441 or a second determining sub-module 442.

The first determining sub-module 441 is configured to, in response to determining that for a network slice that the UE expects to use but the base station does not support, the number of the network slice exceeds a preset number, determine an area where the network slice that the number exceeds the preset number as the problematic coverage area of the network.

The second determining sub-module 442 is configured to determine a network slice that is not supported by the base station and determine an area corresponding to the network slice that is not supported by the base station as the problematic coverage area of the network based on the network slice(s) supported by the base station and the network slices currently provided for the base station.

The problematic coverage area of the network can be determined in various ways. For example, in a case of determining that for a network slice that the UE expects to use but the base station does not support, the number of the network slices exceeds a preset number, an area where the network slice that the number exceeds the preset number is located is determined as the problematic coverage area of the network.

For example, in response to determining that, for the network slice 2 that the UE expects to use but the base station does not support, the number of the network slices 2 exceeds the preset number, the area where the network slice 2 is located can be determined as the problematic coverage area of the network, and the operator can deploy the network slice 2 for the base station, to meet needs of the UE.

In this embodiment, the network slice(s) that is not supported by the base station can be determined based on the identifier(s) of the network slice(s) supported by the corresponding base station reported by the UE, and the area where the network slice(s) not supported by the base station is located is determined as the problematic coverage area of the network.

For example, the base station can receive that the network slices supported by the base station that are reported by the UE1 are network slices 1, 2, and 3, the network slices supported by the base station that are reported by the UE2 are network slices 1, 3, and 4, and the network slices supported by the base station that are reported by the UE3 are network slices 1, 2, and 4. It can be determined that the network slices supported by the base station are network slices 1, 2, 3, and 4. In a case where the network slices currently provided for the base station are network slices 1-6, where each network slice corresponds to a determined physical coverage area (the division of areas can be adjusted), it can be determined that the base station does not support the network slices 5 and 6. In the above embodiment, the MDT measurement of the network slice is performed based on the MDT measurement configuration information of the network slice, and in response to meeting the measurement reporting condition, the MDT measurement information of the network slice is reported to the base station, such that the base station can perform targeted network optimization based on the MDT measurement information of the network slice In the above embodiment, the problematic coverage area of the network can be determined in various ways, to perform the targeted network optimization.

Figure 6:
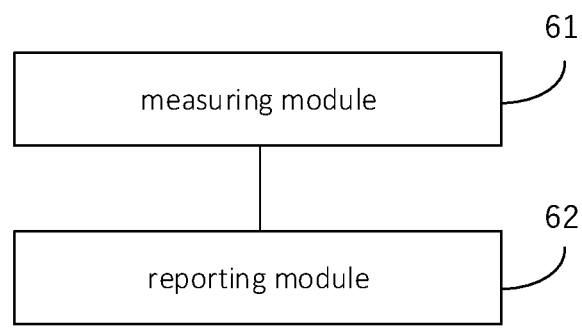
FIG. 6 is a block diagram illustrating an apparatus for reporting measurement information in accordance with an embodiment of the disclosure.

FIG. 6 is a block diagram illustrating a device for reporting measurement information in accordance with an embodiment of the disclosure. The device is included in a UE. As illustrated in FIG. 6, the device includes a measuring module 61 and a reporting module 62.

The measuring module 61 is configured to perform DT measurement of a network slice based on MDT measurement configuration information of the network slice while entering an idle state or an inactive state.

While the UE is in the idle state or the inactive state, the UE may perform the MDT measurement of the network slice based on the MDT measurement configuration information of the network slice, and save the MDT measurement information of the network slice.

In this embodiment, the MDT measurement configuration information of the network slice may include at least one of a first correspondence between a base station and network slice(s) supported by the base station and a second correspondence between a TA and network slice(s) supported by the TA. For example, the MDT measurement configuration information may include an identifier of a corresponding base stations and an identifier of network slice(s) supported by the corresponding base station, as well as an identifier of a corresponding TA and identifier(s) of network slice(s) supported by the corresponding TA.

In this embodiment, the MDT measurement configuration information of the network slice may also include at least one of identifier(s) of the network slice(s) that the UE expects to use but the base station does not support, and identifier(s) of the network slice(s) that the UE expects to use but the TA does not support. For example, the MDT measurement configuration information of the network slice may include a network slice 1 that is expected to be used by the UE but is not supported by the base station #1, and a network slice 3 that is expected to be used by the UE but is not supported by the TA1.

The reporting module 62 is configured to report the MDT measurement information of the network slice measured by the measuring module 61 to the base station when a measurement reporting condition is met.

The measurement reporting condition may include, but is not limited to, measurement reporting time, reported measurement information type, and the like.

For example, when the measurement reporting time is reached, the MDT measurement information of the network slice is reported to the base station. After receiving the MDT measurement information of the network slice, the base station can perform network optimization based on the MDT measurement information of the network slice. For example, a corresponding network slice can be deployed for a problematic coverage area of the network. In some examples, the MDT measurement information of the network slice can also be reported to an Operation Administration and Maintenance (OAM), such that the operator can deploy the network slice based on the MDT measurement information.

The problematic coverage area of the network can be determined in various ways. For example, in a case of determining that for a network slice that the UE expects to use but the base station does not support, the number of the network slices exceeds a preset number, an area where the network slice that the number exceeds the preset number is located is determined as the problematic coverage area of the network. As another example, the network slice(s) that is not supported by a base station is determined based on identifier(s) of network slice(s) supported by the base station reported by the UE, and an area where the network slice(s) that is not supported by the base station is determined as the problematic coverage area of the network. For example, the base station can receive that the network slices supported by the base station that are reported by the UE1 are network slices 1, 2, and 3, the network slices supported by the base station that are reported by the UE2 are network slices 1, 3, and 4, and the network slices supported by the base station that are reported by the UE3 are network slices 1, 2, and 4. It can be determined that the network slices supported by the base station are network slices 1, 2, 3, and 4. In a case where the network slices currently provided for the base station are network slices 1-6, where each network slice corresponds to a determined physical coverage area (the division of areas can be adjusted), it can be determined that the base station does not support the network slices 5 and 6. Therefore, the areas corresponding to the network slices 5 and 6 can be determined as the problematic coverage area of the network (i.e., an area should have been configured with the network slice but is not configured with any network slice) and the network slices 5 and 6 can be deployed for the base station.

In the above embodiment, the MDT measurement of the network slice is performed based on the MDT measurement configuration information of the network slice, and in response to meeting the measurement reporting condition, the MDT measurement information of the network slice is reported to the base station, such that the base station can perform targeted network optimization based on the MDT measurement information of the network slice.

Figure 7:
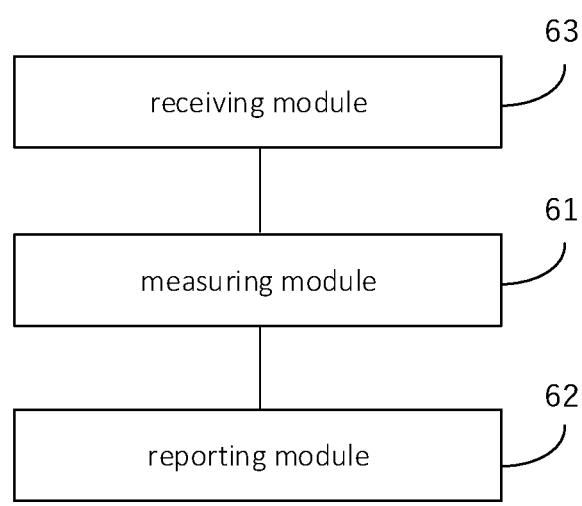
FIG. 7 is a block diagram illustrating another apparatus for reporting measurement information in accordance with an embodiment of the disclosure.

FIG. 7 is a block diagram illustrating another measurement configuration device in accordance with an embodiment of the disclosure. As illustrated in FIG. 7, on the basis of the embodiment illustrated in the above-mentioned FIG. 6, the device may further include a receiving module 63.

The receiving module 63 is configured to receive the MDT measurement configuration information of the network slice sent by the base station before the measuring module 61 performs the MDT measurement of the network slice.

In the above embodiment, by receiving the MDT measurement configuration information of the network slice sent by the base station, it is possible to perform the MDT measurement of the network slice.

Figure 8:
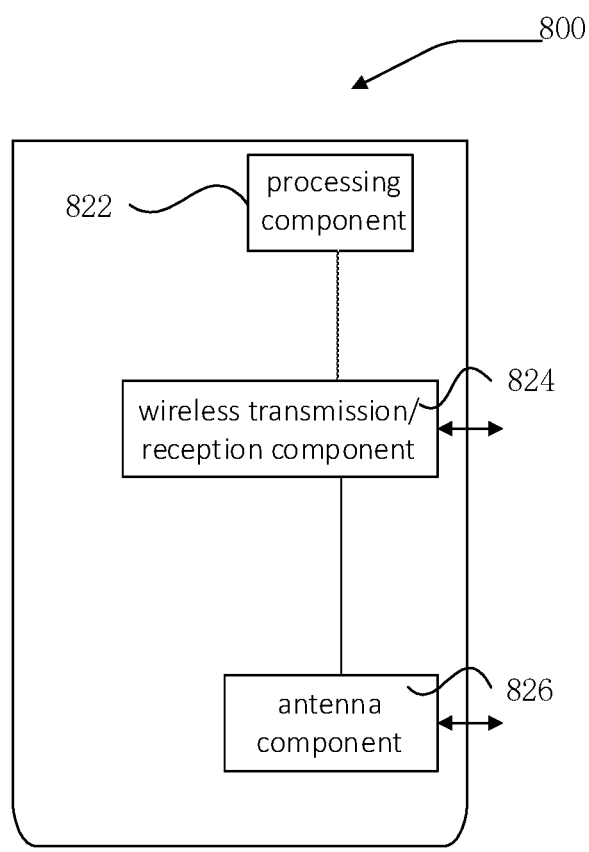
FIG. 8 is a block diagram illustrating an apparatus suitable for measurement configuration in accordance with an embodiment of the disclosure.

FIG. 8 is a block diagram illustrating a device suitable for measurement configuration in accordance with an embodiment of the disclosure. The device 800 may be provided as a base station. As illustrated in FIG. 8, the device 800 includes a processing component 822, a wireless transmission/reception component 824, an antenna component 826, and a signal processing section specific to a wireless interface. The processing component 822 may further include one or more processors.

One of the processors in the processing component 822 may be configured to:
  generate minimization of drive tests (MDT) measurement configuration information of a network slice for a user equipment (UE) that supports the MDT; and
  send the MDT measurement configuration information of the network slice to the UE.

In any embodiment, there is also provided a non-transitory computer-readable storage medium, including instructions executable by the processing component 822 of the device 800 to perform the measurement configuration method described above. For example, the non-transitory computer-readable storage medium may be ROM, random access memory (RAM), CD-ROM, magnetic tape, floppy disk, optical data storage device, and the like.

Figure 9:
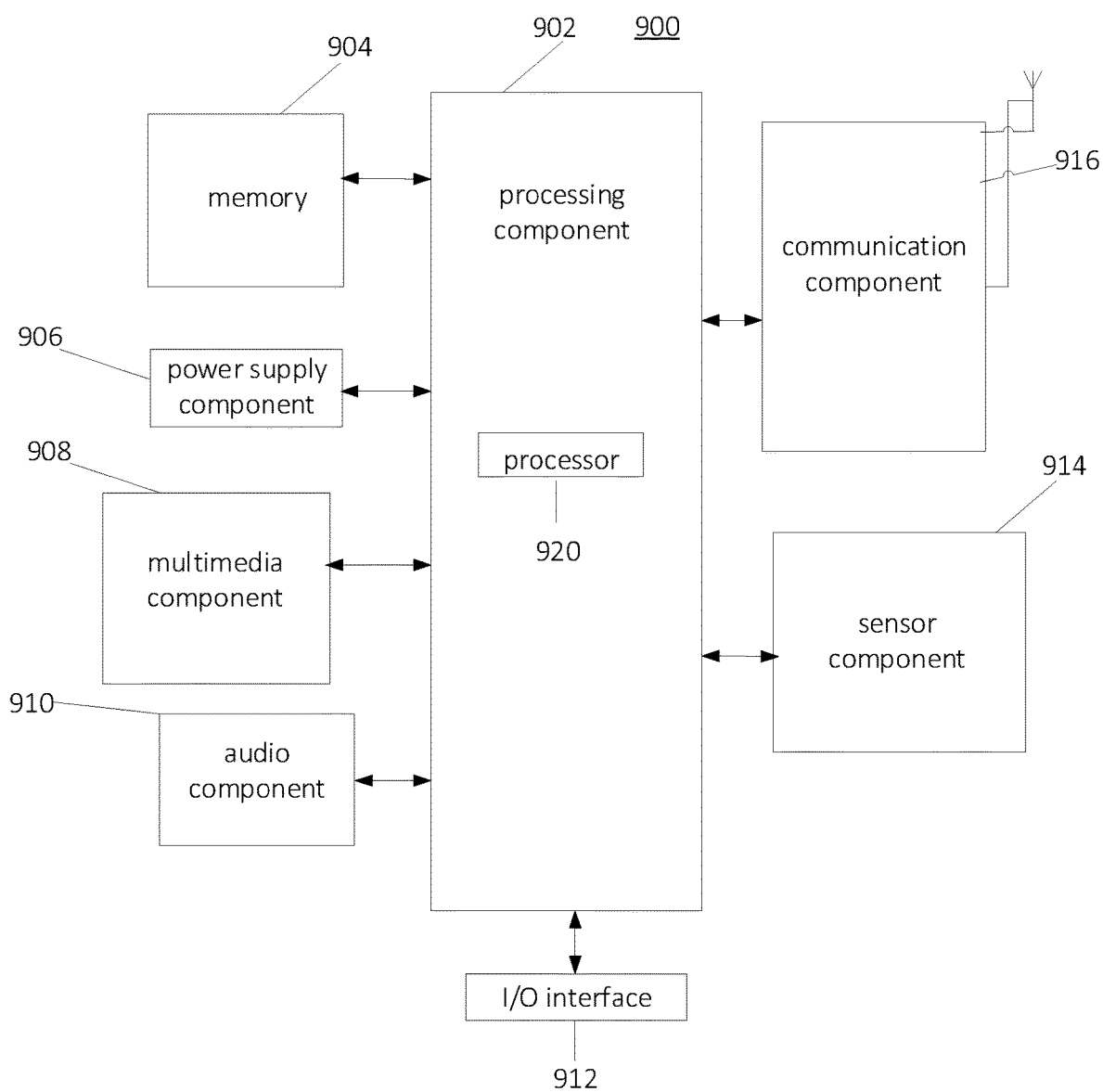
FIG. 9 is a block diagram illustrating an apparatus suitable for reporting measurement information in accordance with an embodiment of the disclosure.

FIG. 9 is a block diagram illustrating a device suitable for reporting measurement information in accordance with an embodiment of the disclosure. For example, the device 900 may be a user equipment, such as a mobile phone, a computer, a digital broadcast terminal, a messaging device, a game console, a tablet device, a medical device, a fitness device, a personal digital assistant, or the like.

As illustrated in FIG. 9, the device 900 may include one or more of the following: processing component 902, memory 904, power supply component 906, multimedia component 908, audio component 910, input/output (I/O) interface 912, sensor component 914, and communication component 916.

The processing component 902 generally controls an overall operation of the device 900, such as operations associated with display, phone calls, data communications, camera operations, and recording operations. The processing component 902 may include one or more processors 920 to execute instructions to perform all or some of the steps of the methods described above. In addition, the processing component 902 may include one or more modules to facilitate interaction between the processing component 902 and other components. For example, the processing component 902 may include a multimedia module to facilitate the interaction between multimedia component 908 and the processing component 902.

One of the processors 920 in the processing component 902 may be configured to:

perform MDT measurement of the network slice based on the MDT measurement configuration information of the network slice when entering an idle state or an inactive state; and report the MDT measurement information of the network slice to the base station in response to meeting a measurement reporting condition.

The memory 904 is configured to store various types of data to support operations of the device 900. Examples of such data include instructions for any application or method operating on the device 900, contact data, phonebook data, messages, pictures, videos, and the like. The memory 904 may be implemented by any type of volatile or nonvolatile storage device or combination thereof, such as static random access memory (SRAM), electrically erasable programmable read only memory (EEPROM), erasable Programmable Read Only Memory (EPROM), Programmable Read Only Memory (PROM), Read Only Memory (ROM), Magnetic Memory, Flash Memory, Magnetic Disk or Optical Disk.

The power supply component 906 provides power to various components of the device 900. The power supply components 906 may include a power management system, one or more power supplies, and other components associated with generating, managing, and distributing power to the device 900.

The multimedia component 908 includes a screen that provides an output interface between the device 900 and the user. In some embodiments, the screen may include a liquid crystal display (LCD) and a touch panel (TP). If the screen includes a touch panel, the screen may be implemented as a touch screen to receive input signals from a user. The touch panel includes one or more touch sensors to sense touch, swipe, and gestures on the touch panel. A touch sensor can sense not only the boundaries of a touch or swipe action, but also the duration and pressure associated with the touch or swipe action. In some embodiments, the multimedia component 908 includes a front-facing camera and/or a rear-facing camera. When the device 900 is in an operating mode, such as a shooting mode or a video mode, the front-facing camera and/or the rear-facing camera may receive external multimedia data. Each of the front-facing and rear-facing cameras can be a fixed optical lens system or have focal length and optical zoom capability.

The audio component 910 is configured to output and/or input audio signals. For example, the audio component 910 includes a microphone (MIC) that is configured to receive external audio signals when the device 900 is in operating modes, such as call mode, recording mode, and voice recognition mode. The received audio signal may be further stored in the memory 904 or transmitted via the communication component 916. In some embodiments, the audio component 910 also includes a speaker for outputting audio signals.

The I/O interface 912 provides an interface between the processing component 902 and peripheral interface modules, which may be keyboards, click wheels, buttons, and the like. These buttons may include, but are not limited to, home button, volume buttons, start button, and lock button.

The sensor component 914 includes one or more sensors for providing status assessment of various aspects of the device 900. For example, the sensor assembly 914 can detect the open/closed state of the device 900, the relative positioning of the components, such as the display and keypad of the device 900. The sensor component 914 can also detect a change in the position of the device 900 or components of the device 900, the presence or absence of contact with the device 900, the orientation or acceleration/deceleration of the device 900 and the temperature change of the device 900. The sensor component 914 may include a proximity sensor configured to detect the presence of nearby objects in the absence of any physical contact. The sensor component 914 may also include a light sensor, such as a CMOS or CCD image sensor, for use in imaging applications. In some embodiments, the sensor component 914 may also include an acceleration sensor, a gyroscope sensor, a magnetic sensor, a pressure sensor, or a temperature sensor.

The communication component 916 is configured to facilitate wired or wireless communication between the device 900 and other devices. The device 900 may access wireless networks based on communication standards, such as WiFi, 2G or 3G, or a combination thereof. In some embodiments, the communication component 916 receives broadcast signals or broadcast related information from an external broadcast management system via a broadcast channel. In some embodiments, the communication component 916 also includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an example, the device 900 may be implemented by one or more application specific integrated circuits (ASICs), digital signal processors (DSPs), digital signal processing devices (DSPDs), programmable logic devices (PLDs), Field Programmable Gate Array (FPGA), controller, microcontroller, microprocessor or other electronic components are implemented to implement the above-mentioned methods for reporting measurement information.

In an example, there is also provided a non-transitory computer-readable storage medium including instructions, such as a memory 904 including instructions. The instructions can be executed by the processor 920 of the device 900 to execute the above-mentioned method for reporting measurement information. For example, the non-transitory computer-readable storage medium may be ROM, random access memory (RAM), CD-ROM, magnetic tape, floppy disk, optical data storage device, and the like.

The base station generates the MDT measurement configuration information of the network slice for the UE supporting the MDT, and sends the corresponding MDT measurement configuration information to the UE, such that the UE can report the MDT measurement information of the network slice to the base station based on the MDT measurement configuration information. Since the MDT measurement information of the network slice includes the information about whether the base station supports the network slice or not, it is possible to perform the targeted network optimization based on the MDT measurement information of the network slice.

The UE performs the MDT measurement of the network slice based on the MDT measurement configuration information of the network slice, and report the MDT measurement information of the network slice to the base station when the measurement reporting condition is met, such that the base station can perform the targeted network optimization based on the MDT measurement information of the network slice.

With regard to the device embodiments, since they basically correspond to the method embodiments, reference may be made to the partial descriptions of the method embodiments for related parts. The device embodiments described above are only illustrative, where the units described as separate components may or may not be physically separated, and the components shown as units may or may not be physical units, that is, they may be located in one place, or distributed to multiple network elements. Some or all of the modules may be selected according to actual needs to achieve the purpose of the solution in the disclosure. Those of ordinary skill in the art can understand and implement it without creative effort.

It is to be noted that in this disclosure, relational terms such as first and second are used only to distinguish one entity or operation from another, and do not necessarily require or imply these entities or that there is any such actual relationship or sequence between operations. The terms "comprising", "comprising" or any other variation thereof are intended to encompass non-exclusive inclusion such that a process, method, article or device including a list of elements includes not only those elements, but also other not expressly listed elements, or also include elements inherent to such a process, method, article or apparatus. Without further limitation, an element qualified by the phrase "comprising a . . . " does not preclude the presence of additional identical elements in a process, method, article or apparatus that includes the element.

Other embodiments of the disclosure will readily occur to those skilled in the art upon consideration of the specification and practice of the disclosure disclosed herein. This disclosure is intended to cover any variations, uses, or adaptations of the disclosure that follow the general principles of the disclosure and include common knowledge or techniques in the technical field not disclosed by the disclosure. The specification and examples are to be regarded as exemplary only, with the true scope and spirit of the disclosure being indicated by the following claims.

It is to be understood that the disclosure is not limited to the precise structures described above and illustrated in the accompanying drawings, and that various modifications and changes may be made without departing from the scope thereof. The scope of the disclosure is limited only by the appended claims.

What is claimed is:

1. A measurement configuration method, comprising:
    generating, by a base station, minimization of drive tests (MDT) measurement configuration information of a network slice for a user equipment (UE) supporting MDT; and
    sending, by the base station, the MDT measurement configuration information of the network slice to the UE; and
    receiving MDT measurement information of the network slice reported, based on the MDT measurement configuration information, by the UE, the MDT measurement information of the network slice comprises information about whether the base station supports the network slice or not;
    wherein the MDT measurement configuration information comprises an identifier of a network slice that the UE expects to use but the base station does not support, an identifier of a network slice that the UE expects to use but a tracking area (TA) does not support, or both the identifier of the network slice that the UE expects to use but the base station does not support and the identifier of the network slice that the UE expects to use but the TA does not support.

2. The method of claim 1, wherein the MDT measurement configuration information comprises a first correspondence between the base station and a network slice supported by the base station, a second correspondence between a tracking area (TA) and a network slice supported by the TA, or both the first correspondence and the second correspondence.

3. The method of claim 1, further comprising:
    receiving MDT measurement information of the network slice supported by the UE; and
    performing network optimization based on the MDT measurement information of the network slice.

4. The method of claim 3, wherein performing the network optimization based on the MDT measurement information of the network slice comprises:
    in response to determining, based on the MDT measurement information of the network slice, that for a network slice that the UE expects to use but the base station does not support, the number of the network slices exceeds a preset number, determining the network slice that the number exceeds the preset number as a problematic coverage area of the network; or
    determining a network slice that the base station does not support based on the network slice that the base station supports and the network slices currently provided to the base station, and determining an area corresponding to the network slice that the base station does not support as a problematic coverage area of the network.

5. A method for reporting measurement information, comprising:
    performing, by a user equipment (UE), minimization of drive tests (MDT) measurement of a network slice based on MDT measurement configuration information of the network slice in response to entering an idle state or an inactive state to obtain MDT measurement information of the network slice; and
    reporting, by the UE, the MDT measurement information of the network slice to a base station in response to meeting a measurement reporting condition, wherein the MDT measurement information of the network slice comprises information regarding whether or not the base station supports the network slice or not;
    wherein the MDT measurement configuration information comprises an identifier of a network slice that the UE expects to use but the base station does not support, an identifier of a network slice that the UE expects to use but a tracking area (TA) does not support, or both the identifier of the network slice that the UE expects to use but the base station does not support and the identifier of the network slice that the UE expects to use but the TA does not support.

6. The method of claim 5, further comprising:
    receiving the MDT measurement configuration information of the network slice sent by the base station.

7. The method of claim 5, wherein the MDT measurement configuration information comprises a first correspondence between the base station and a network slice supported by the base station, a second correspondence between a tracking area (TA) and a network slice supported by the TA, or both the first correspondence and the second correspondence.

8. A base station, comprising:
    a processor; and
    a memory, for storing instructions executable by the processor;
    wherein the processor is configured to execute a measurement configuration method of claim 1, the method comprising:

generating minimization of drive tests (MDT) measurement configuration information of a network slice for a user equipment (UE) supporting MDT; and sending the MDT measurement configuration information of the network slice to the UE; and receiving MDT measurement information of the network slice reported, based on the MDT measurement configuration information, by the UE, the MDT measurement information of the network slice comprises information regarding whether or not the base station supports the network slice or not;

wherein the MDT measurement configuration information comprises an identifier of a network slice that the UE expects to use but the base station does not support, an identifier of a network slice that the UE expects to use but a tracking area (TA) does not support, or both the identifier of the network slice that the UE expects to use but the base station does not support and the identifier of the network slice that the UE expects to use but the TA does not support.

9. A user equipment (UE), comprising:
a processor; and
a memory, for storing instructions executable by the processor;
wherein the processor is configured to:
perform minimization of drive tests (MDT) measurement of a network slice based on MDT measurement configuration information of the network slice in response to entering an idle state or an inactive state to obtain MDT measurement information of the network slice; and
report the MDT measurement information of the network slice to a base station in response to meeting a measurement reporting condition, wherein the MDT measurement information of the network slice comprises information regarding whether or not the base station supports the network slice or not;

wherein the MDT measurement configuration information comprises an identifier of a network slice that the UE expects to use but the base station does not support, an identifier of a network slice that the UE expects to use but a tracking area (TA) does not support, or both the identifier of the network slice that the UE expects to use but the base station does not support and the identifier of the network slice that the UE expects to use but the TA does not support.

10. A non-transitory computer readable storage medium, having computer instructions stored thereon, wherein when the instructions are executed by a processor, a measurement configuration method of claim 1 is executed.

11. A non-transitory computer readable storage medium, having computer instructions stored thereon, wherein when the instructions are executed by a processor, a method for reporting measurement configuration of claim 5 is executed.

12. The UE of claim 9, wherein the processor is further configured to:
receive the MDT measurement configuration information of the network slice sent by the base station.

13. The UE of claim 9, wherein the MDT measurement configuration information comprises a first correspondence between the base station and a network slice supported by the base station, a second correspondence between a tracking area (TA) and a network slice supported by the TA, or both the first correspondence and the second correspondence.

14. The base station of claim 8, wherein the MDT measurement configuration information comprises a first correspondence between the base station and a network slice supported by the base station, a second correspondence between a tracking area (TA) and a network slice supported by the TA, or both the first correspondence and the second correspondence.

15. The base station of claim 8, wherein the method further comprises:
receiving MDT measurement information of the network slice supported by the UE; and
performing network optimization based on the MDT measurement information of the network slice.

16. The method of claim 15, wherein performing the network optimization based on the MDT measurement information of the network slice comprises:
in response to determining, based on the MDT measurement information of the network slice, that for a network slice that the UE expects to use but the base station does not support, the number of the network slices exceeds a preset number, determining the network slice that the number exceeds the preset number as a problematic coverage area of the network; or
determining a network slice that the base station does not support based on the network slice that the base station supports and the network slices currently provided to the base station, and determining an area corresponding to the network slice that the base station does not support as a problematic coverage area of the network.

* * * * *